United States Patent
Donham et al.

(10) Patent No.: US 7,565,490 B1
(45) Date of Patent: Jul. 21, 2009

(54) OUT OF ORDER GRAPHICS L2 CACHE

(75) Inventors: Christopher D. S. Donham, San Mateo, CA (US); John S. Montrym, Los Altos Hills, CA (US); Patrick R. Marchand, Apex, NC (US)

(73) Assignee: NVIDIA Corporation, Santa Clara, CA (US)

( * ) Notice: Subject to any disclaimer, the term of this patent is extended or adjusted under 35 U.S.C. 154(b) by 587 days.

(21) Appl. No.: 11/313,587

(22) Filed: Dec. 20, 2005

(51) Int. Cl.
*G06F 12/00* (2006.01)

(52) U.S. Cl. .................. 711/122; 711/129; 711/144; 345/537; 345/558; 345/559; 345/565

(58) Field of Classification Search .................. 711/122, 711/129, 144; 345/537, 558, 559, 565
See application file for complete search history.

(56) References Cited

U.S. PATENT DOCUMENTS

| | | | | |
|---|---|---|---|---|
| 5,555,392 A | * | 9/1996 | Chaput et al. | 711/118 |
| 5,557,733 A | * | 9/1996 | Hicok et al. | 345/554 |
| 2001/0049771 A1 | * | 12/2001 | Tischler et al. | 711/133 |
| 2002/0069326 A1 | * | 6/2002 | Richardson et al. | 711/122 |
| 2005/0052449 A1 | * | 3/2005 | Emberling | 345/418 |

* cited by examiner

*Primary Examiner*—Stephen C Elmore
*Assistant Examiner*—Mark A Giardino, Jr.
(74) *Attorney, Agent, or Firm*—Townsend and Townsend and Crew LLP; J. Matthew Zigmant

(57) ABSTRACT

Circuits, methods, and apparatus that provide an L2 cache that services requests out of order. This L2 cache processes requests that are hits without waiting for data corresponding to requests that are misses to be returned from a graphics memory. A first auxiliary memory, referred to as a side pool, is used for holding subsequent requests for data at a specific address while a previous request for data at that address is serviced by a frame buffer interface and graphics memory. This L2 cache may also use a second auxiliary memory, referred to as a take pool, to store requests or pointers to data that is ready to be retrieved from an L2 cache.

19 Claims, 16 Drawing Sheets

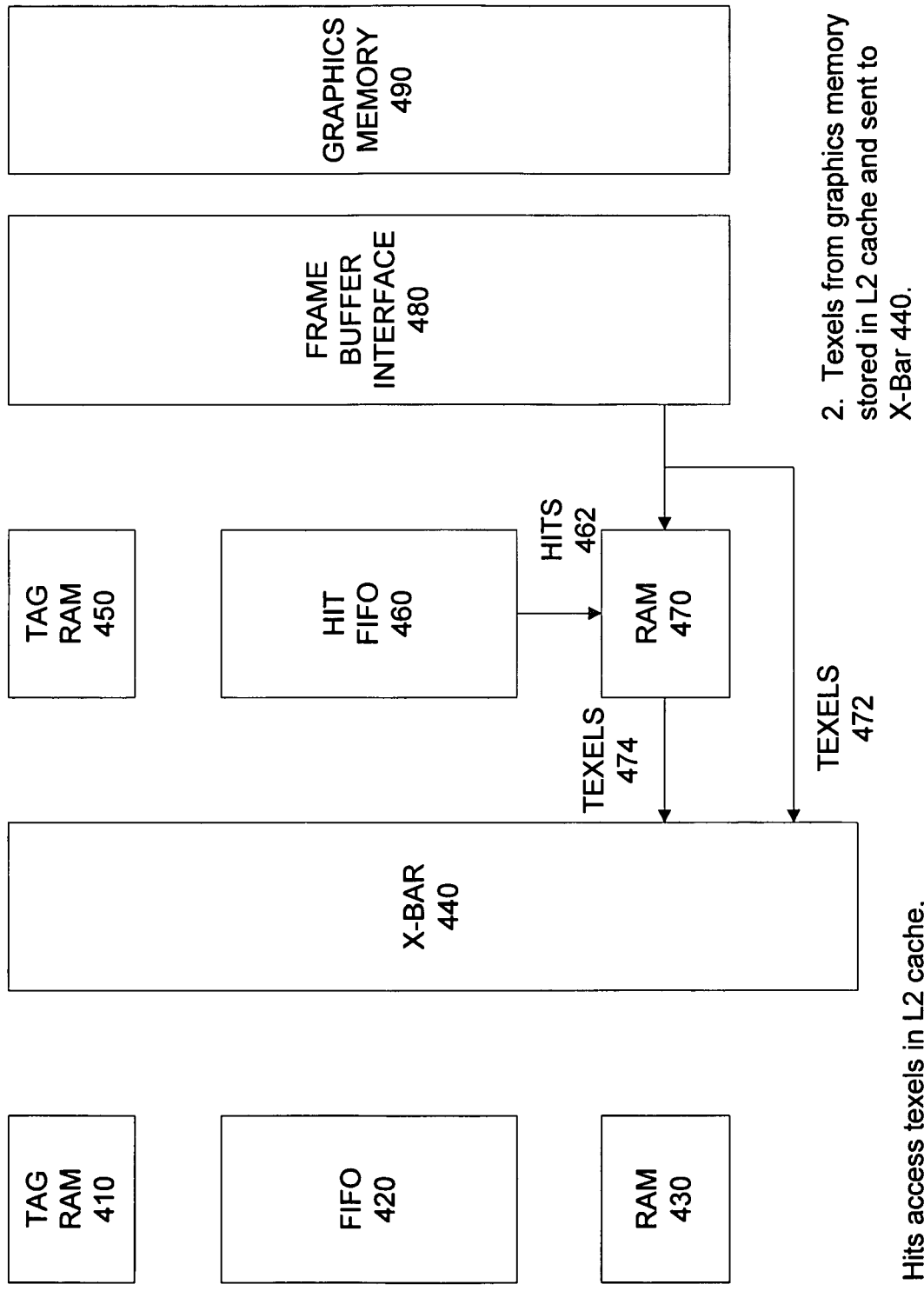

OUT OF ORDER GRAPHICS L2 CACHE

BACKGROUND

The present invention relates to data caching in general, and more particularly to a second-level (L2) cache that services read requests out of order.

Modern graphics processing circuits process incredible amounts of data to generate detailed graphics images for games and commercial applications. Textures are one type of this data. Textures are the surface patterns on structures in a graphics image. They are made up of individual texels, and often several texels contribute to each pixel of an image.

Texels are processed in a graphics processor by texture filters and shaders. A texture cache stores textures until needed by a filter and shader. But memory space is limited; these caches cannot store every texel that may be needed. Accordingly, a higher level cache is used; this is referred to as a second-level or L2 cache. If the texture cache does not have a needed texel, it requests it from the L2 cache. But the L2 cache is also limited; when it does not have a requested texel, it retrieves it from a graphics memory. When a texture cache requests data from the L2 cache, if the data is present, the result is an L2 cache hit. If the data is absent from the L2 cache, an L2 cache miss is said to occur.

When an L2 miss occurs, the L2 cache requests data from the graphics memory via a frame buffer interface. The return trip for this request can be hundreds of clock cycles. By comparison, a hit can be serviced very quickly since the data is already present in the L2 cache. But conventional texture cache designs require data to be returned in its requested order. Since the time to service a miss is long, subsequent hits may be stalled behind an earlier miss. Because of this, many cache circuits artificially slow the response to a hit, or use complicated logic to reorder requests to their original sequence.

For example, a first request may be a miss. While the first request is retrieved from a graphics memory, a second request that is a hit may be received. It is undesirable to have the second request delayed unnecessarily. This is particularly true when an L2 cache is used to service requests from more than one texture cache; different texture caches may have made the first and the second requests. In such a case, the texture cache making the second request has no reason to wait for the first request to be serviced.

Thus, what is needed is an L2 cache that can service requests in an out-of-order fashion.

SUMMARY

Accordingly, what is needed are circuits, methods, and apparatus that provide an L2 cache that services requests out of order. An exemplary embodiment of the present invention processes requests that are hits without waiting for data for requests that are misses to be returned from a graphics memory.

One exemplary embodiment of the present invention utilizes a first auxiliary memory, referred to as a side pool, for holding subsequent requests for data at a specific address while a previous request for data at that address is serviced by a frame buffer interface and graphics memory.

Specifically, if a first request for data at an address is a miss, a subsequent request for data at that address is treated as a hit and placed in a queue. If the subsequent request emerges from the queue before data for the first request is retrieved, the subsequent request is placed in the side pool. After data for the first request is stored in cache, the second request exits the side pool and is serviced.

Another exemplary embodiment of the present invention provides a second auxiliary memory for storing requests or pointers to data that is ready to be retrieved from an L2 cache. This memory, referred to as a take pool, provides circuitry acting as an intermediary between one or more texture caches and an L2 cache with information regarding the number of requests that have been serviced and the age of one or more of those requests.

In a specific embodiment of the present invention, each of a first number of L2 caches provides data for a second number of texture caches. The first number and second number may be different, and one or both need not be integer powers of two. Each L2 cache provides data to a second number of take pools, one take pool per texture cache. An intermediary circuit, referred to as a crossbar, selects data from the L2 cache via the take pools and provides it to the texture caches. The crossbar circuitry may arbitrate between the take pools. The criteria for arbitration may be age, which may be defined as the time since the L2 cache received a request, and urgency, which may be defined as how close a requesting texture cache is to needing its requested data. Various embodiments of the present invention may incorporate these and the other features described herein.

A better understanding of the nature and advantages of the present invention may be gained with reference to the following detailed description and the accompanying drawings.

BRIEF DESCRIPTION OF THE DRAWINGS

FIGS. 4A-D illustrate the transfer of data in the block diagram of FIG. 3;

DESCRIPTION OF EXEMPLARY EMBODIMENTS

Figure 1:
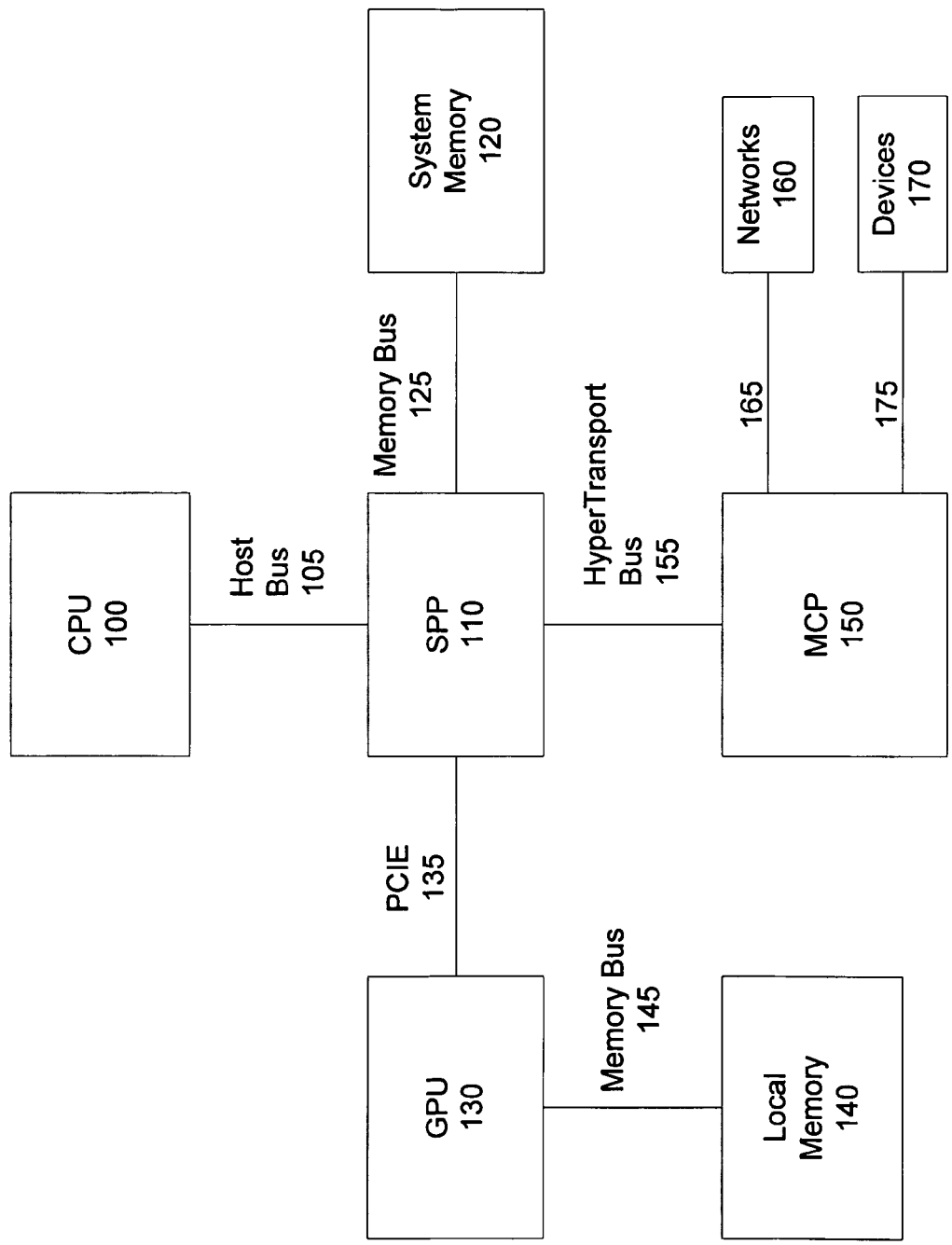
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, frame buffer, local, or graphics memory 140, MCP 150, networks 160, and internal and peripheral devices 170.

The CPU 100 connects to the SPP 110 over the host bus 105. The SPP 110 is in communication with the graphics processing unit 130 over an advanced graphics port (AGP) or peripheral component interconnect express (PCIE) bus 135. The SPP 110 reads and writes data to and from the system memory 120 over the memory bus 125. The MCP 150 communicates with the SPP 110 via a high-speed connection such as a HyperTransport bus 155, and connects network 160 and internal and peripheral devices 170 to the remainder of the computer system. The graphics processing unit 130 receives data over the AGP or PCIE bus 135 and generates graphic and video images for display over a monitor or other display device (not shown). The graphics processing unit 130 may make use of a frame buffer or graphics memory 140—via the memory bus 145—as well as the system memory 120.

The CPU 100 may be a processor, such as those manufactured by Intel Corporation or Advanced Micro Devices, more likely the former, or other supplier, and are well-known by those skilled in the art. The SPP 110 and MCP 150 are commonly referred to as a chipset. The memory 120 is often a number of dynamic random access memory devices arranged in a number of the dual in-line memory modules (DIMMs). The graphics processing unit 130, SPP 110, and MCP 150 are preferably manufactured by NVIDIA Corporation of Santa Clara, Calif.

Embodiments of the present invention may be used to improve the graphics processing unit 130. Also, other systems are improved by the incorporation of embodiments of the present invention. For example, the GPU 130 and SPP 110 may be combined as an integrated graphics processor or IGP. This device is similarly improved by the incorporation of embodiments of the present invention. Moreover, other types of processors, such as video, audio, or general purpose processors, and other types of processors and circuits may be improved by the incorporation of embodiments of the present invention. Also, while embodiments of the present invention are well suited to texel storage, other types of data in graphics, video, audio, or other applications may be similarly improved. Further, other types of circuits will be developed, or are currently being developed, and these may also be improved by the incorporation of embodiments of the present invention.

Figure 2:
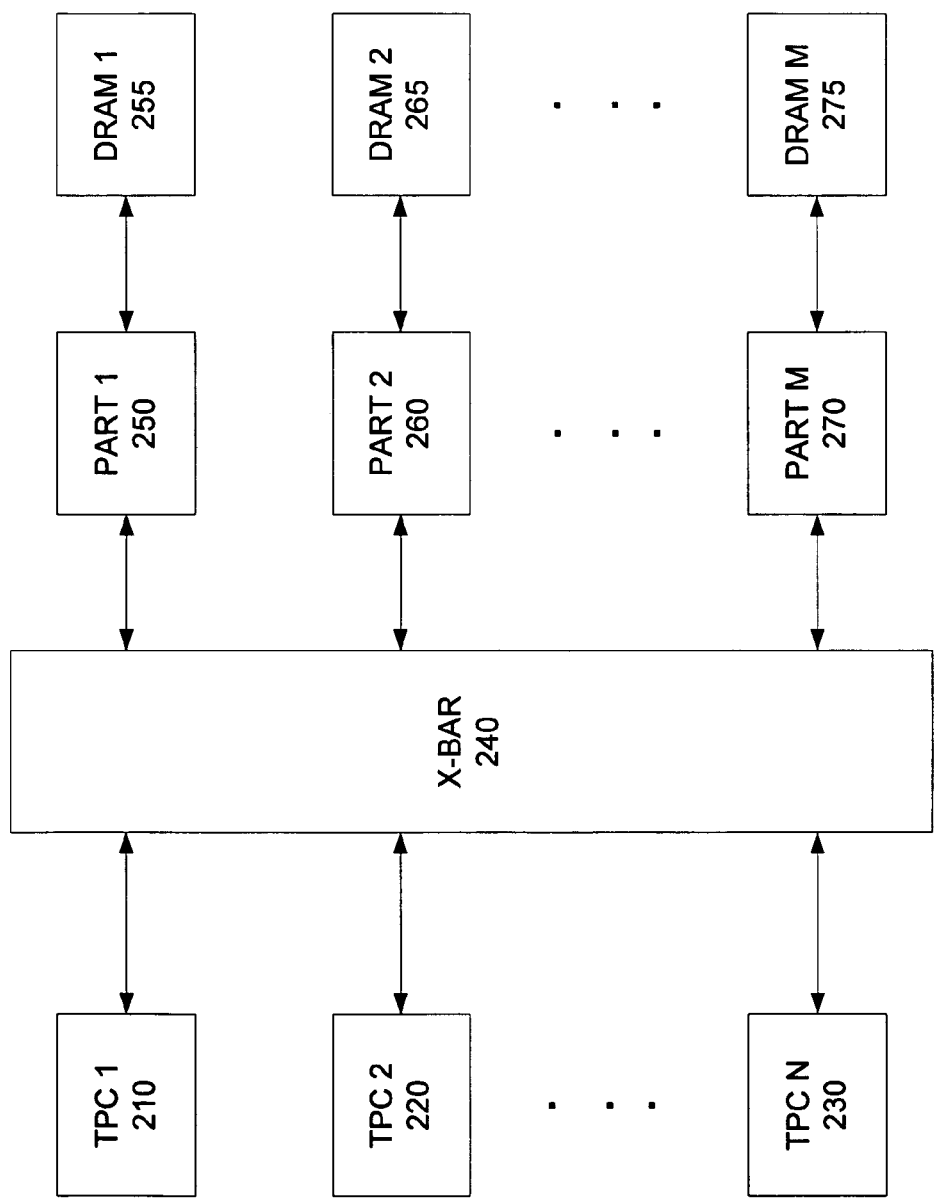
FIG. 2 is a block diagram of a portion of a graphics system including a first number of texture pipeline caches communicating with a second number of memory partitions via a crossbar according to an embodiment of the present invention.

FIG. 2 is a block diagram of a portion of a graphics system including a first number of texture pipeline caches communicating with a second number of memory partitions via a crossbar according to an embodiment of the present invention. Each partition stores and retrieves data from a memory or DRAM. Typically, the texture pipeline caches, crossbar, and partitions are formed on an integrated circuit, while the DRAMs are one or more separate integrated circuits. The texture caches, crossbar, and partitions may be part of a graphics processing unit, or they may be part of an integrated circuit that includes graphics processing circuitry. This and the other included figures are shown for exemplary purposes only, and do not limit either the possible embodiments of the present invention or the claims.

Specifically, this figure includes texture pipeline caches 210-230, crossbar 240, partitions 1 250 through N 270, and DRAM 1 255 through N 275. The number of texture caches and the number of partitions may be equal or unequal. In a specific embodiment of the present invention, there are eight texture pipeline caches and 6 partitions. In other embodiments of the present invention, other numbers of texture caches and partitions may be used, and these numbers may be powers of 2 or non powers of 2, that is, they may be numbers that are or are not found by $2^{\wedge\wedge}X$, where X is an integer and $^{\wedge\wedge}$ is a symbol meaning "to the power of."

In this configuration, each texture cache may receive data from any partition via the crossbar 240. In other embodiments of the present invention, the partitions that can be accessed by any particular texture cache may be limited. A texture cache stores texels for use in a graphics pipeline. If needed texels are not available in the texture cache, the texture cache requests those texels from the partitions via the crossbar 240. The crossbar 240 directs the request to the appropriate partition. Each partition includes a second-level cache that supplies the texels, if available in the L2 cache. If the requested texels are not available in the L2 cache, the partition requests the texels from its corresponding DRAM. Once the partition has received the requested texels, the partition provides the texels to the texture cache via the crossbar 240.

Conventionally, texture caches allocate space for needed texels as they are received from the partitions. Accordingly, the texture caches require texel data to be returned in the order the requests are made. If texels are returned out of order, there may not be proper locations for each texel to be stored in the texture cache. Often, long delays or complex logic circuits are implemented to reorder texels to ensure that they are provided to texture caches in the requested sequence.

Accordingly, embodiments of the present invention utilize texture caches that allocate space for texels as they are requested from the partitions. This "allocate on miss" configuration requires the texture caches to be larger in size since space is reserved for a texel before it is received from the partitions. This configuration can simplify partition design and allow the partitions to supply texels to the texture caches as soon as they become available, as opposed to waiting for texels to be reordered. A more detailed block diagram of a texture cache and a partition that is consistent with an embodiment of the present invention is shown in the following figure.

Figure 3:
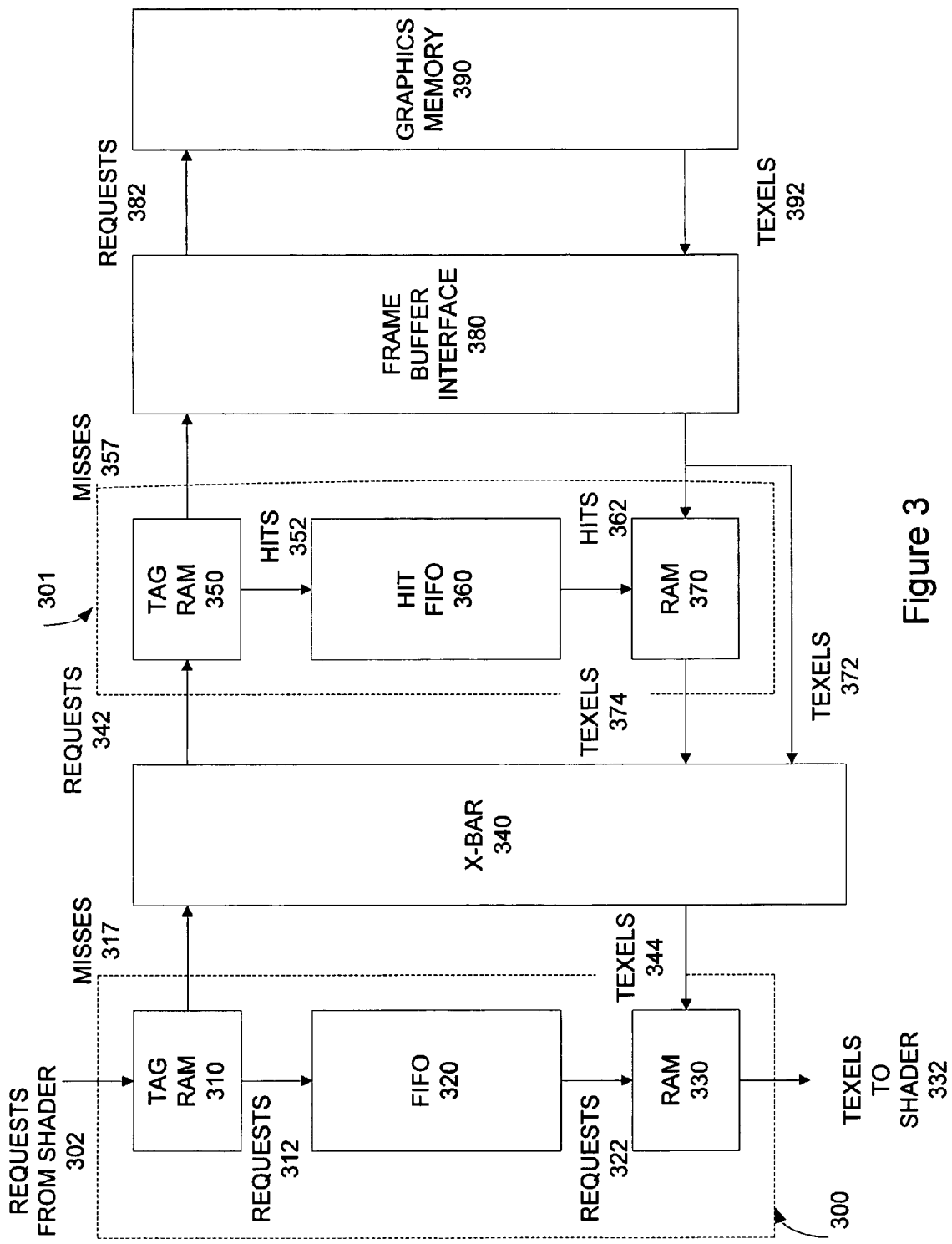
FIG. 3 is a block diagram of a single texture pipeline cache communicating with an L2 cache in a partition via a crossbar according to an embodiment of the present invention.

FIG. 3 is a block diagram of a single texture pipeline cache communicating with an L2 cache in a partition via a crossbar according to an embodiment of the present invention. This figure includes a texture cache 300 that includes a tag RAM 310, latency FIFO or other buffer 320, RAM 330, a crossbar 340, and a partition including a second-level cache 301 that includes tag RAM 350, hit FIFO 360, and RAM 370, as well as a frame buffer interface 380 that communicates with a graphics memory 390. Typically, several texture caches communicate with several partitions via the crossbar 340, though only one texture cache 300 and one partition are shown for simplicity.

Requests for texels are received from the shader on line 302 by the tag RAM 310. The tag RAM 310 determines whether the needed texels are stored in the texture cache 300 or need to be retrieved from the partitions. If the needed texels are not stored in the texture cache 300, the tag RAM 310 provides the request on line 317 to the crossbar 340. The tag RAM 310 provides each request, hit or miss, on line 312 to the latency FIFO 320.

The latency FIFO 320 delays the requests, giving the partitions time to provide missing texels on line 344 to the RAM 330. As requests emerge from the latency FIFO 320 on line 322, the appropriate texels are read from the RAM 330 and provided to the shader on line 322.

Requests for missing texels are provided by the crossbar 340 to the appropriate partition on line 342. The tag RAM 350 receives the requests on line 342 and determines whether the needed texels are available in the L2 cache. If the texels are not available in the L2 cache, the tag RAM 350 requests the data from the frame buffer interface 380. If the data is available in the second-level cache 301, the tag RAM 350 provides the request to a hit FIFO 360 on line 352.

Frame buffer interface 380 provides requests on line 382 to the graphics memory or DRAM 390, which provides texels back to frame buffer interface 380 on line 392. The frame buffer interface provides these texels to the RAM 370 and directly to the crossbar 340 on line 372. In this way, the crossbar 340 does not need to wait for data to be read from the RAM 370. Requests that are hits emerge from the hit FIFO 360 on line 362, and corresponding texels are read from the RAM 370 and provided on line 374 to the crossbar 340. Again, the crossbar 340 provides the texels to the appropriate texture cache on line 344.

Figure 4A:
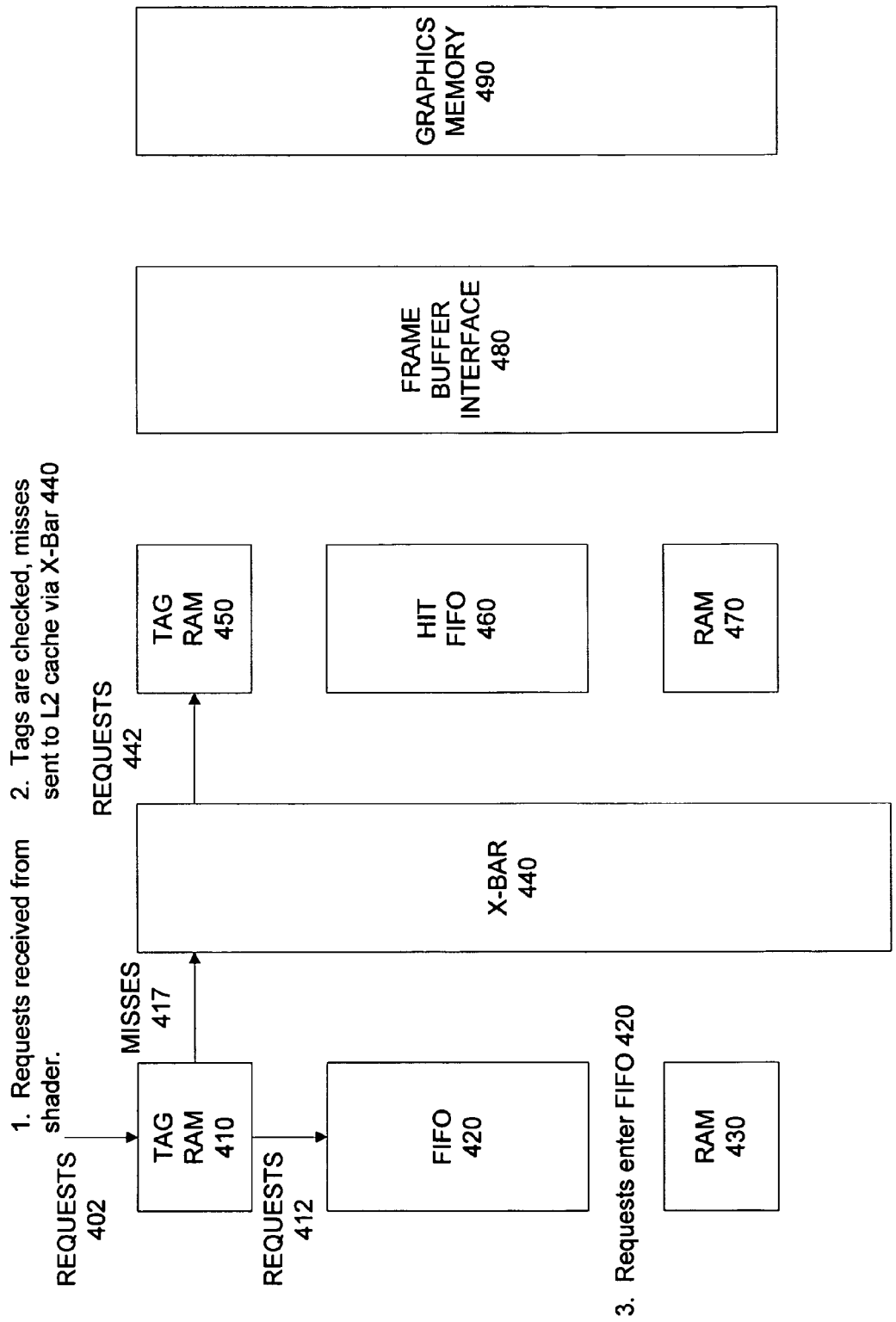

FIGS. 4A-D illustrate the transfer of data in the block diagram of FIG. 3. In FIG. 4A, requests are received from the shader by the tag RAM 410 on line 402. Requests enter the FIFO 420 on line 412. Requests for data that is not stored in the RAM 430 are provided to the crossbar 440 on line 417 by the tag RAM 410. The crossbar 440 directs the request to the appropriate partition and provides the request on line 442 to a tag RAM 450.

Figure 4B:
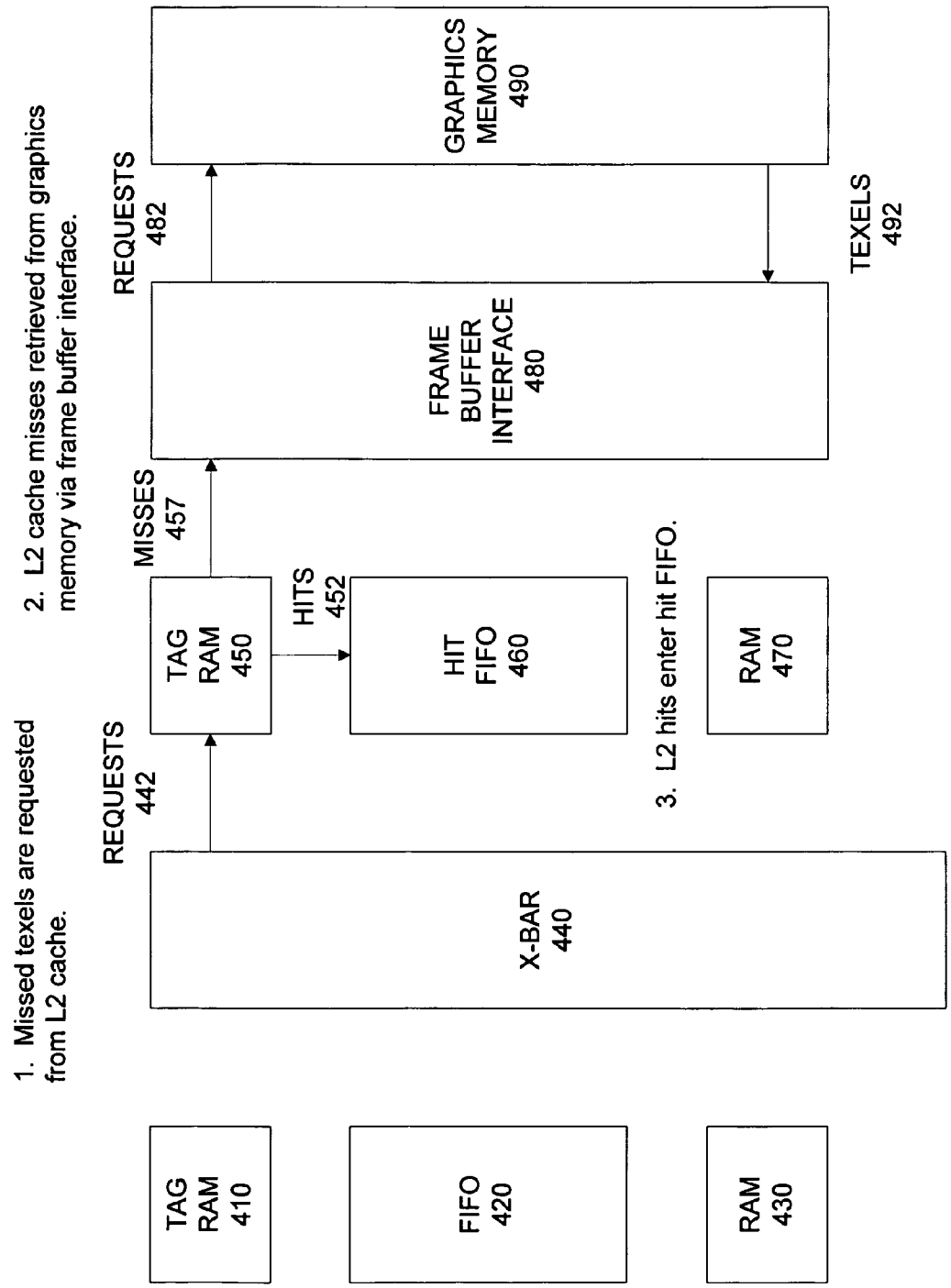

In FIG. 4B, texels are requested from the L2 cache on line 442. The tag RAM 450 determines whether the needed texels are stored in the second-level cache memory, RAM 470, or need to be retrieved from the graphics memory 490. Miss requests are provided to the frame buffer interface 480 on line 457. The frame buffer interface 480 provides requests on line 482 to the graphics memory 490 and receives texels on line 492. The requests received by the tag RAM 450 that are hits are provided to the hit FIFO 460 on line 452.

In FIG. 4C, requests that were hits emerge from the hit FIFO 460 on line 462 and are received by the RAM 470. The hit requests access data in the RAM 470 and provided texels on line 472 to crossbar 440. Texels requested from the graphics memory 490 are stored in the RAM 470 and provided to the crossbar on line 472. This provides texels from the frame buffer interface 480 available to the crossbar 440 sooner than if they had to be stored in the RAM 470 and then read and provided on line 474.

Figure 4D:
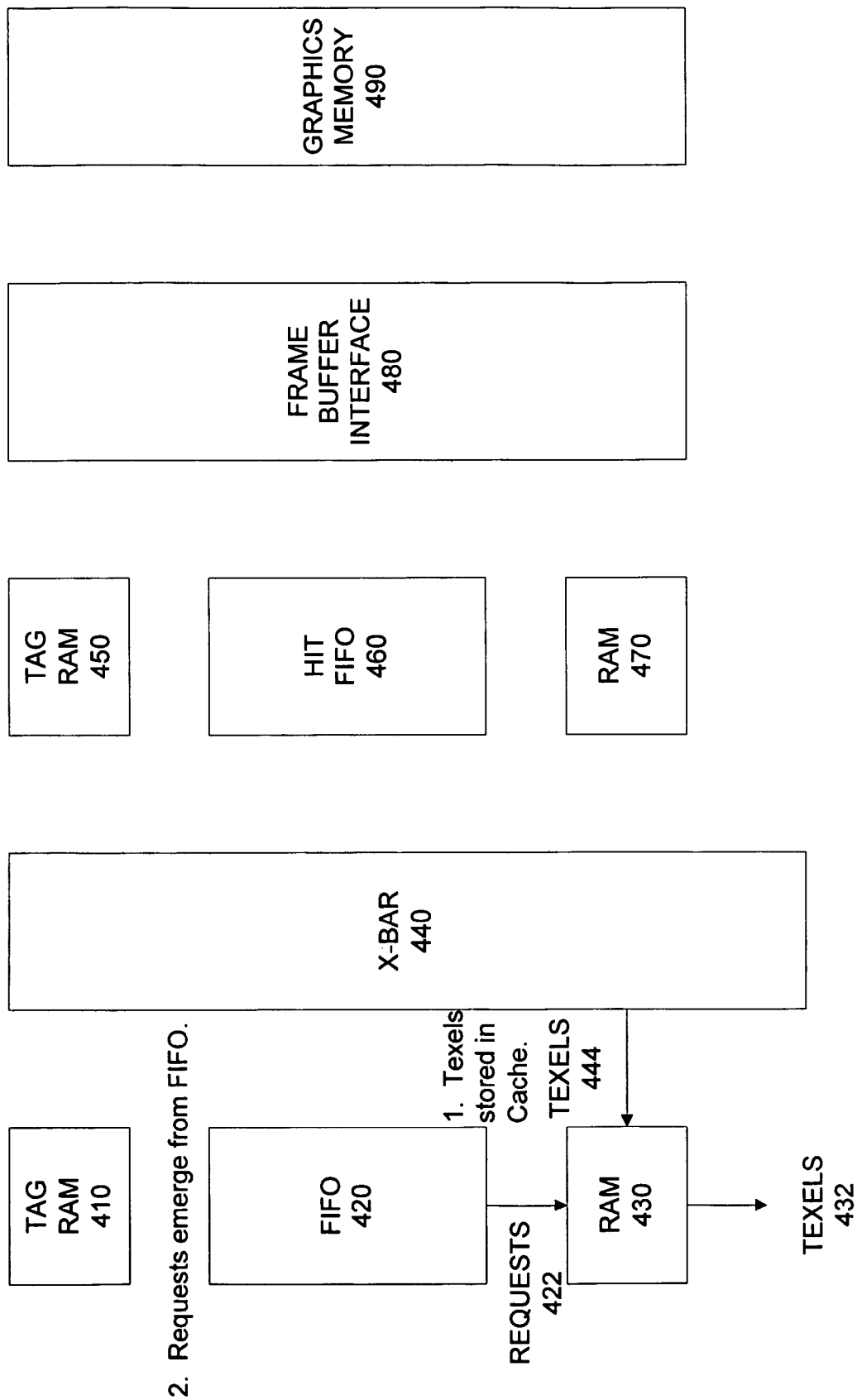

In FIG. 4D, texels are provided by the crossbar 440 on line 444 and stored in the texture cache RAM 430. Requests emerge from the FIFO 420 on line 422 and are read by the RAM 430. Texels are read from the RAM 430 and provided from the texture cache on line 432.

In this way, an L2 cache provides texels on an "as available" basis rather than reordering them into the requested sequence. This allows greater utilization of the crossbar 440. A flowchart of this methodology is shown in the next figure.

Figure 5:
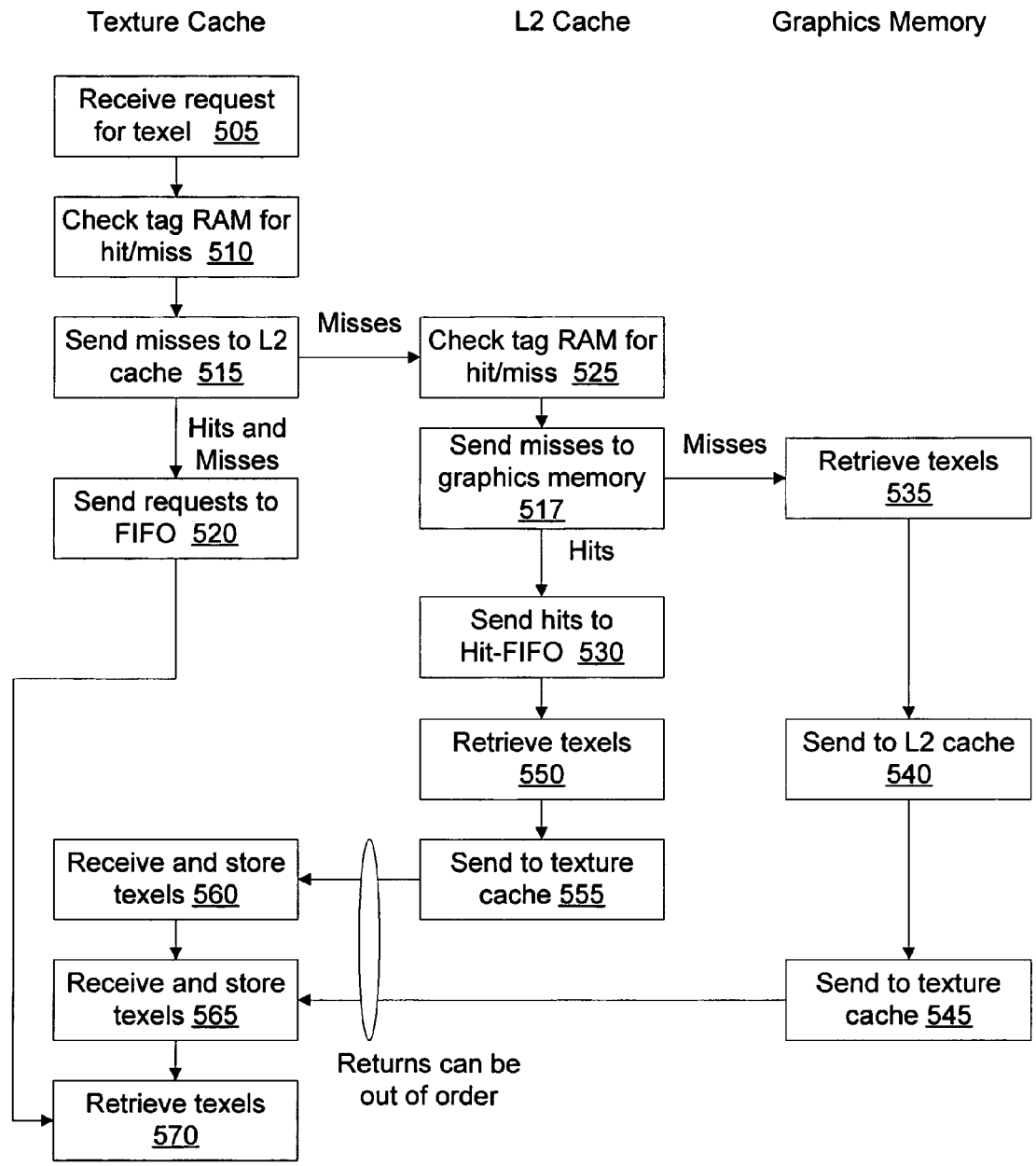
FIG. 5 is a flowchart illustrating the operation of a texture cache and L2 cache according to an embodiment of the present invention.

FIG. 5 is a flowchart illustrating the operation of a texture cache and L2 cache according to an embodiment of the present invention. This flowchart shows the activities and decisions performed by a texture cache, a level 2 cache, and graphics memory. Again, as texels are requested, it is determined whether the texels are currently stored in the texture cache, if they are not, they are retrieved from the level 2 cache. If the level 2 cache is not currently storing the texels, they are requested from the graphics memory and provided to the texture cache.

Specifically, in act 505 a request for texels is received. In act 510, the tag RAM checks whether the request is a hit or a miss, that is whether the required data is stored in the texture cache or needs to be retrieved from the partitions. If the request is a miss, the request is sent to the L2 cache. All requests are sent to the texture cache FIFO in act 515.

The level 2 cache receives requests for missed data and checks its tag RAM to determine whether the request is a hit or a miss at this level. That is, in act 525, it is determined whether the needed texels are stored in the level 2 cache memory or need to be retrieved from the graphics memory. In act 517, the requests that are misses are sent to the graphics memory, while in act 530, the hits are sent to a FIFO.

In act 550, texels are retrieved from the level 2 cache memory, and sent to the texture cache in act 555. In act 560, the texture cache receives and stores these texels.

Requests that were a miss at the level 2 cache in act 517 are provided to the graphics memory, and in act 535, the texels are retrieved. In act 540, the texels are sent to the level 2 cache and stored, and in act 545, the texels are sent to the texture cache. In act 565, the texels are received and stored in the texture cache. In act 570, the needed texels are retrieved from the texture cache memory.

In this way, the L2 cache can return texels in an out of order manner. Specifically, texels provided by the L2 cache and those provided by the graphics memory can be provided to a crossbar circuit as soon as they are available.

A complication can arise in the circuitry FIG. 3. For example, a request is received on line 342 for texels that are not currently in the RAM 370, so a request for the texels is made to the frame buffer interface 380. If a second request for the same texel is received on line 342 by the tag RAM 350, it is undesirable and redundant to send another request for the same data to the frame buffer interface 380. Accordingly, embodiments of the present invention treat the second request as a hit, and the tag RAM 350 provides the request to the hit FIFO 360, but not to the frame buffer interface 380. However, the request is not actually a hit since the data is not yet in the RAM 370. If the request is output by the hit FIFO 360 on line 362 before the data is written to the RAM 370 by the frame buffer interface 380, the proper data is not read from the RAM 370. To avoid this, the request is stalled at the FIFO 360 until the needed data is written to the RAM 370. But stalling the FIFO 360 prevents upstream requests from being serviced.

Accordingly, embodiments of the present invention utilize an auxiliary memory to hold these requests until the needed texel data is provided by the frame buffer interface 380 to the RAM 370. At this time, the auxiliary memory provides the request to the RAM 370, and proper texel data is provided on line 374 to the crossbar 370. This auxiliary memory may be referred to as a side pool. Embodiments of the present invention may incorporate both a side pool and one or more take pools as described in figures below. The operation of a side pool is shown in more detail in the following figures.

Figure 6:
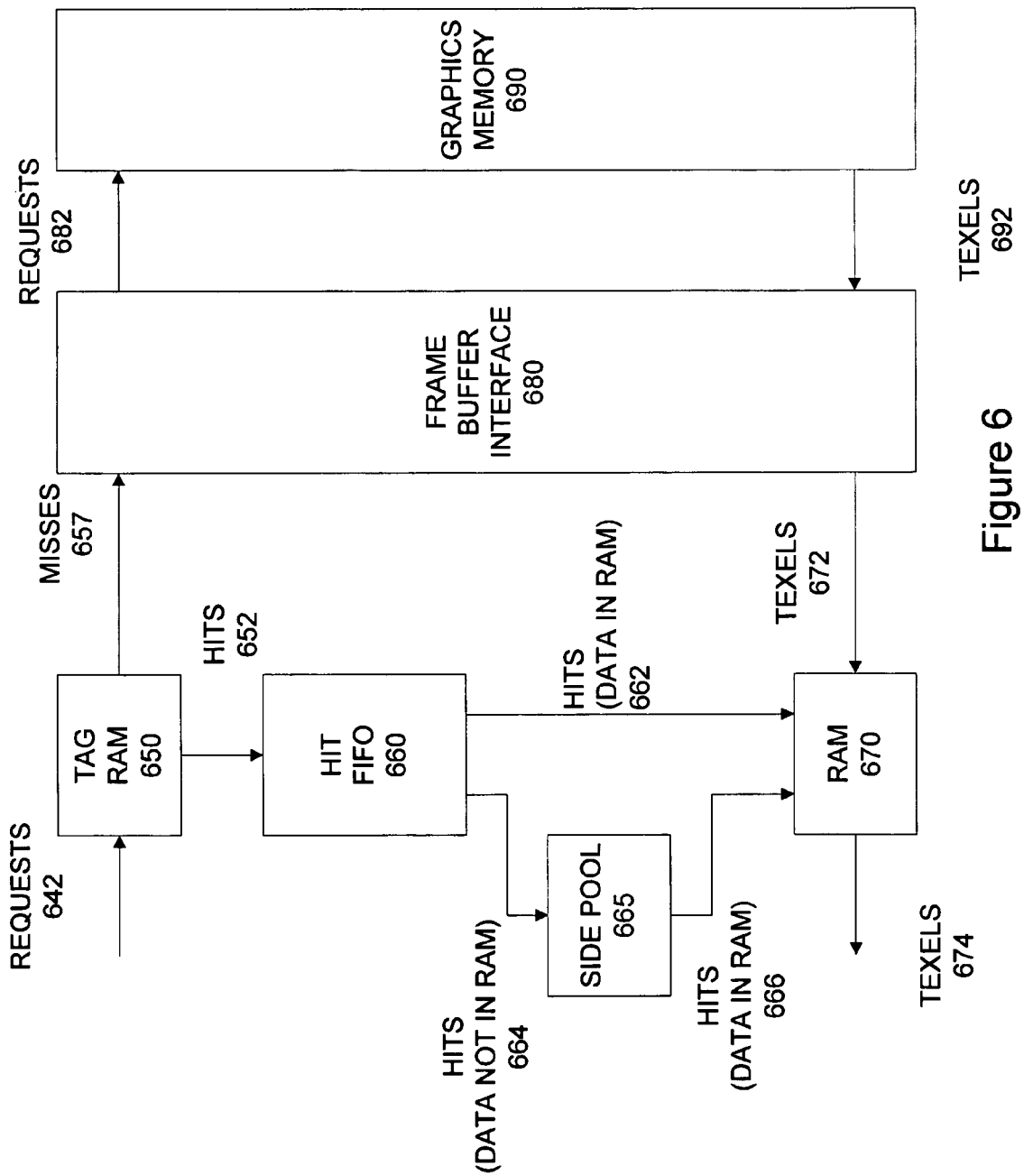
FIG. 6 illustrates the use of an auxiliary memory for holding subsequent data requests to an address while a previous data request to the address is processed.

FIG. 6 illustrates the use of an auxiliary memory for holding subsequent data requests to an address while a previous data request to the address is processed. This figure includes a second-level cache including tag RAM 650, hit FIFO 650, side pool 675, RAM 670, as well as frame buffer interface 680 and a graphics memory 690.

Requests are received on line 642 by the tag RAM 650. If the data requested is not stored in the level 2 cache, and the data is not currently being retrieved by the frame buffer interface 680, the request is directed to the frame buffer interface 680 on line 657. If the requested data is currently stored in the second-level cache, or if the data is currently being retrieved by the frame buffer interface 680, then the request is treated as a hit and provided on line 652 to the hit FIFO 660.

As hit requests are output by the FIFO 660, they are either directed on line 664 to the side pool 675 or on line 662 to the RAM 670. The request hits are directed to the side pool if the requested texels have not yet been written to the RAM 670 by the frame buffer interface 680. The hits are provided by the hit FIFO 660 to the RAM 670 if the needed data has already been stored in the RAM 670. Once the requested data is received and written to the RAM 670, corresponding requests are provided by the side pool 675 on line 666 to the RAM 670. Texels from the RAM 670 are provided on line 674 to the crossbar (not shown).

In various embodiments of the present invention, the side pool 675 may be a memory, or a number of registers or other storage circuits. In a specific embodiment of the present invention, the side pool 675 has a depth of the 4 entries, though in other embodiments of the present invention, other depths such as 6, 8, 16, or other numbers of entries may be used.

FIGS. 7A-D illustrate an example of a transfer of data in an L2 cache when the auxiliary memory of FIG. 6 is utilized. This is one exemplary sequence of events; it will be appreciated by one skilled in the art that many possible sequences of events may occur consistent with embodiments of the present invention.

Figure 7A:
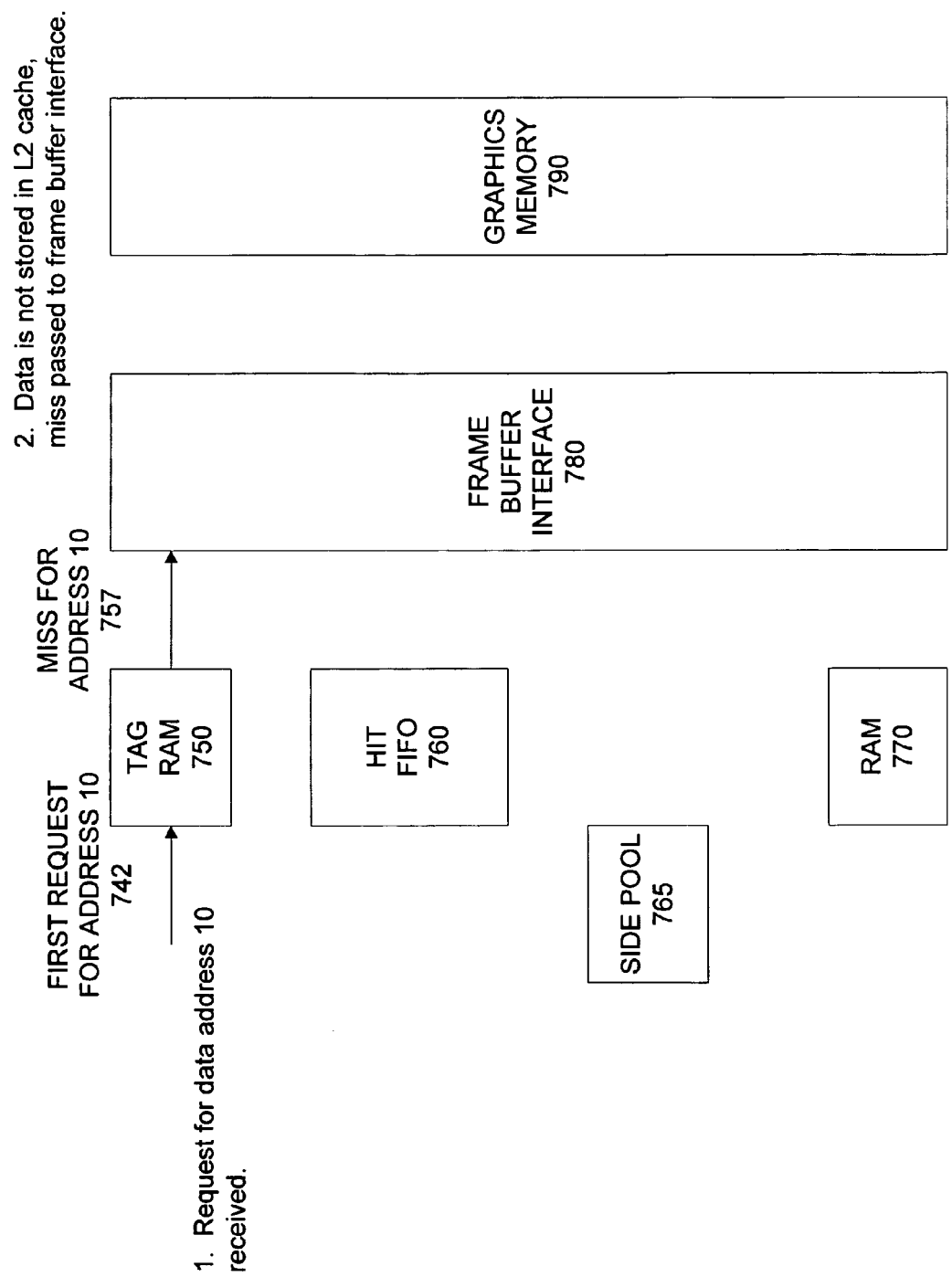
FIGS. 7A-D illustrate the transfer of data in an L2 cache when the auxiliary memory of FIG. 6 is utilized.

In FIG. 7A, a request for data at address 10 is received by the tag RAM 750. This data is not stored in the level 2 cache, so the miss request is passed to the frame buffer interface 780.

Figure 7B:
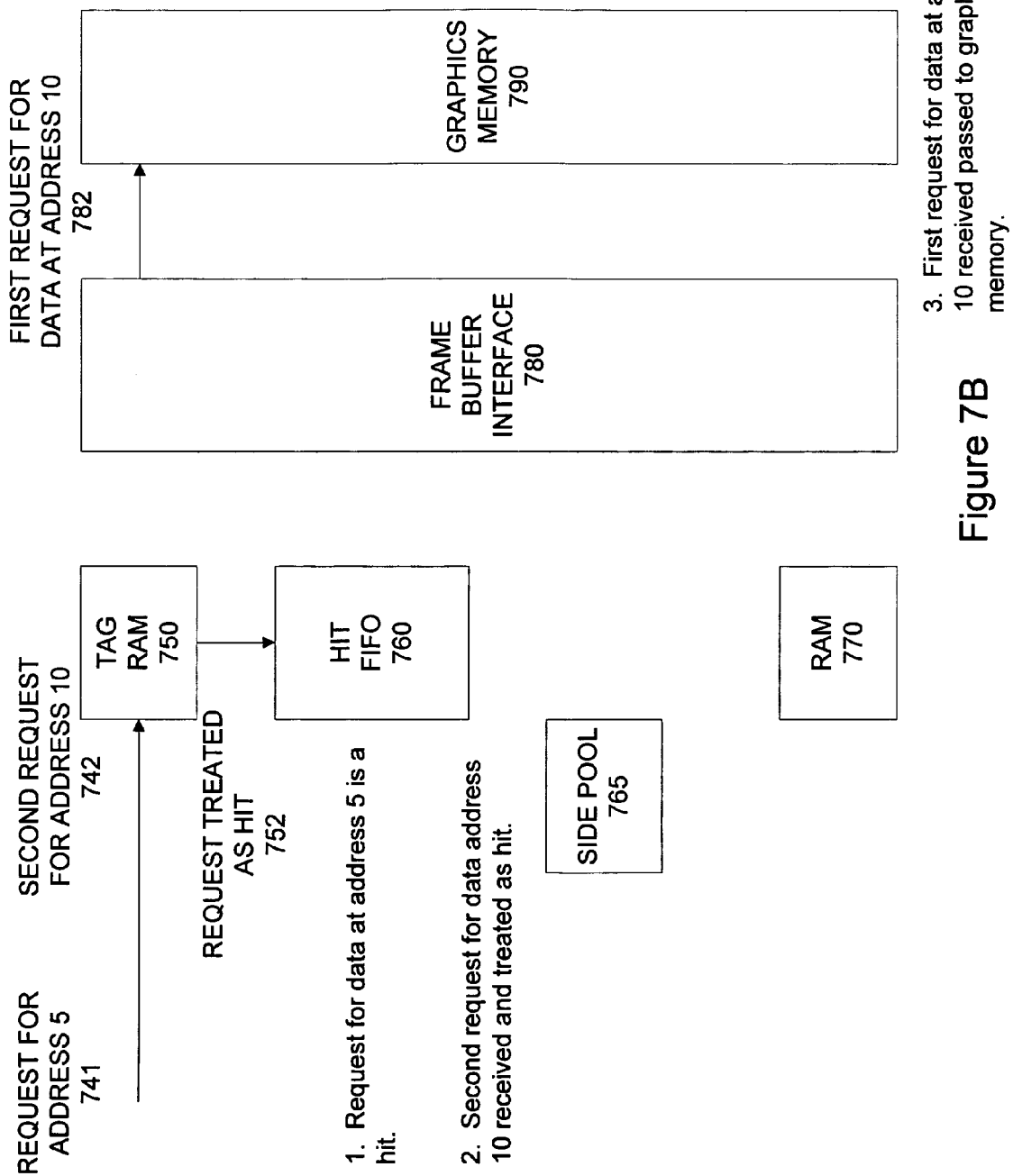

In FIG. 7B, a request for data at address 5 is received by the tag RAM 750. The data at this address is stored in the second-level cache, so the request is provided to the hit FIFO 760. At the same time, the request for data at address 10 is being retrieved from the graphics memory 790.

Figure 7C:
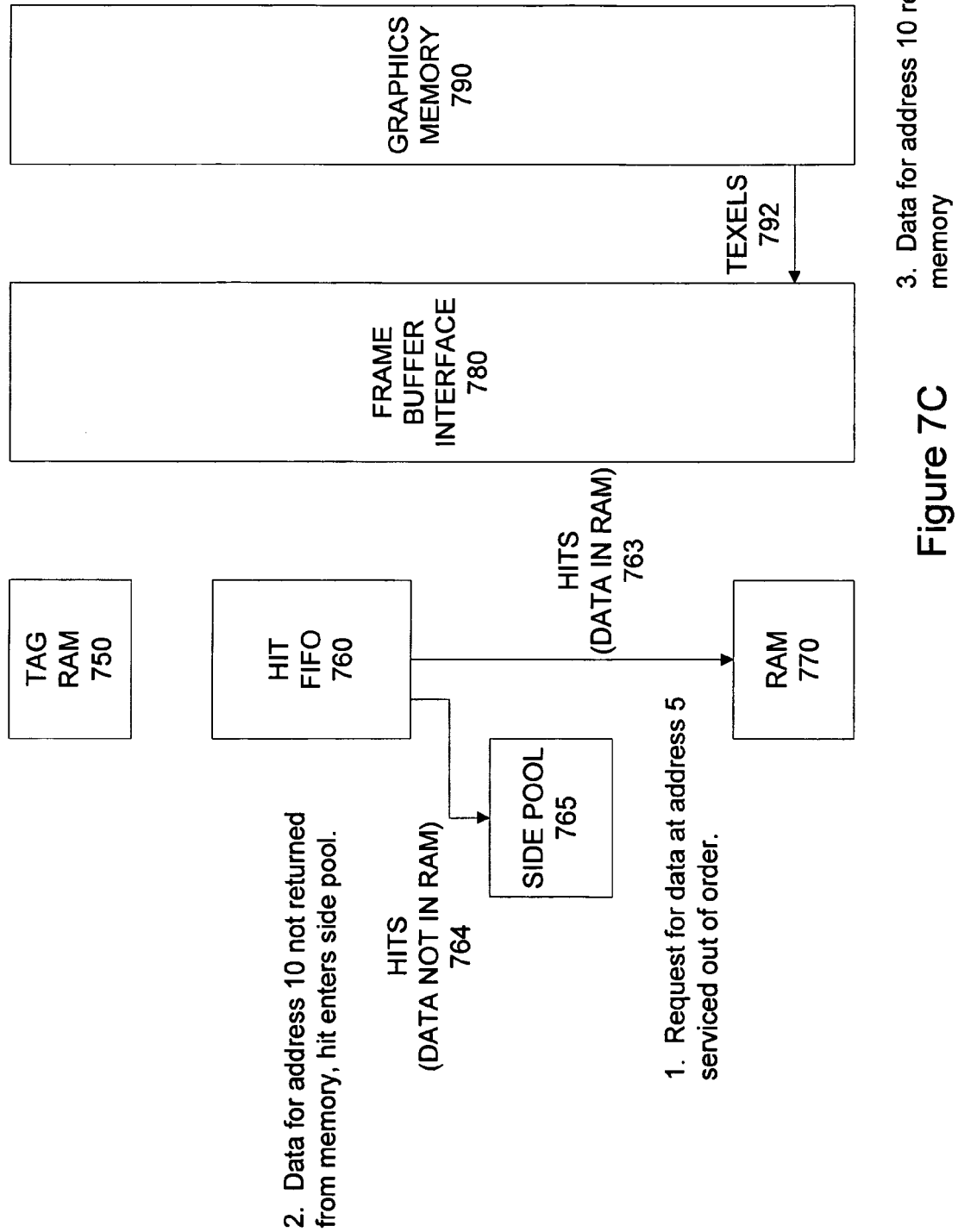

In FIG. 7C, the request for data at address 5 is provided to the RAM 770. In this example, the data for address 10 has not returned from the graphics memory, so the request enters the side pool 765. Meanwhile, data for address 10 is being returned from the graphics memory 790.

Figure 7D:
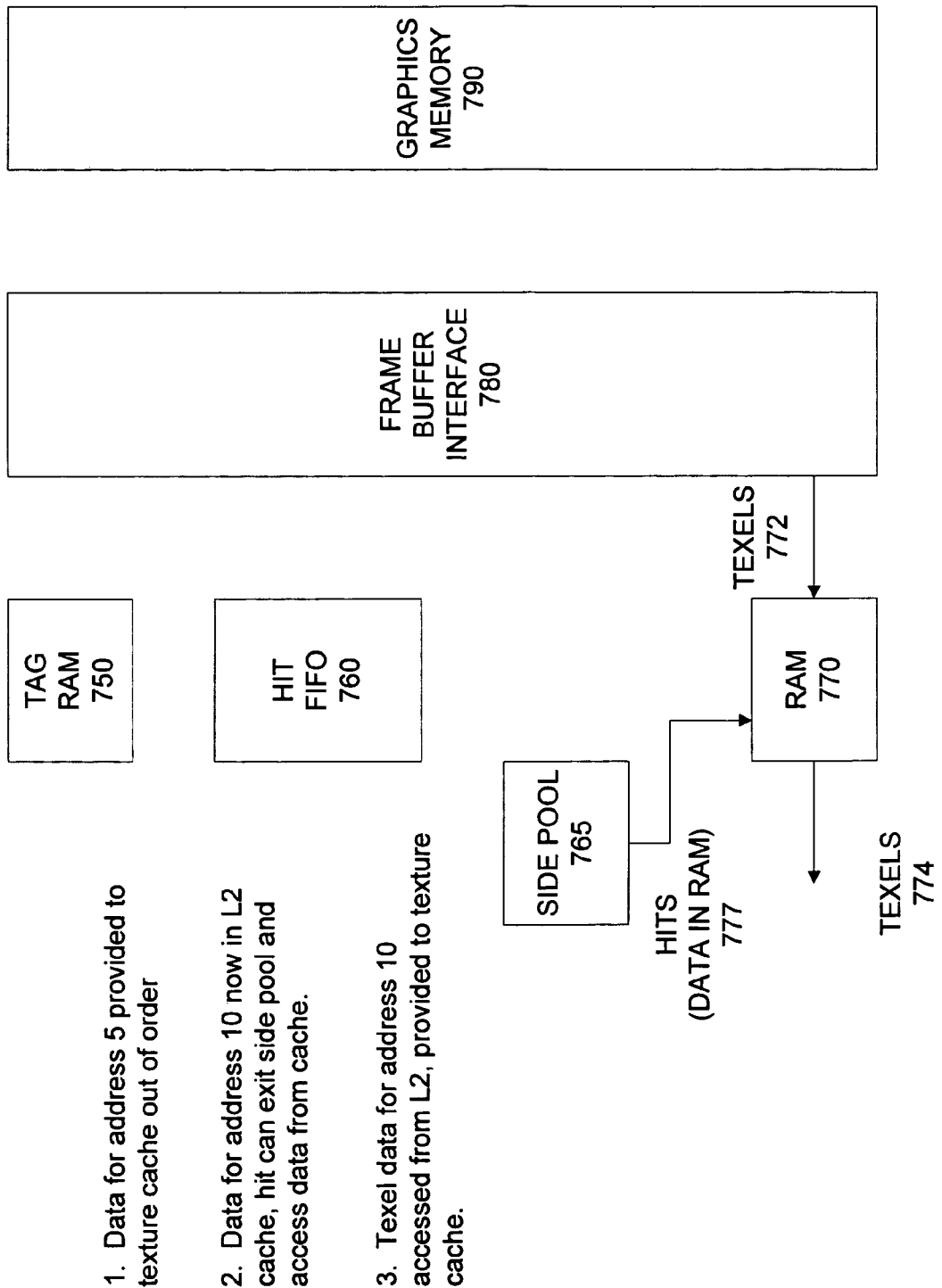

In FIG. 7D, data for address 10 is now stored in the level 2 cache memory, so the hit request can exit the side pool and access data from the RAM 770. Texel data at address 10 is accessed from the L2 cache and provided to the texture cache.

In this example, the use of this architecture allows the request for data at address 5 and at address 10 to be serviced out of order. Specifically, the first request for data at address 10 precedes the request for data at address 5, however, the data at address 5 is provided by the level 2 cache ahead of the data at address 10.

Also, it should be noted that in practical systems, each level of memory, texture cache, L2 cache, and graphics memory uses its own physical addresses. These addresses are translated from virtual addresses by lookup tables such as translational lookaside buffers. These addressing schemes are ignored for simplicity in these examples.

Figure 8:
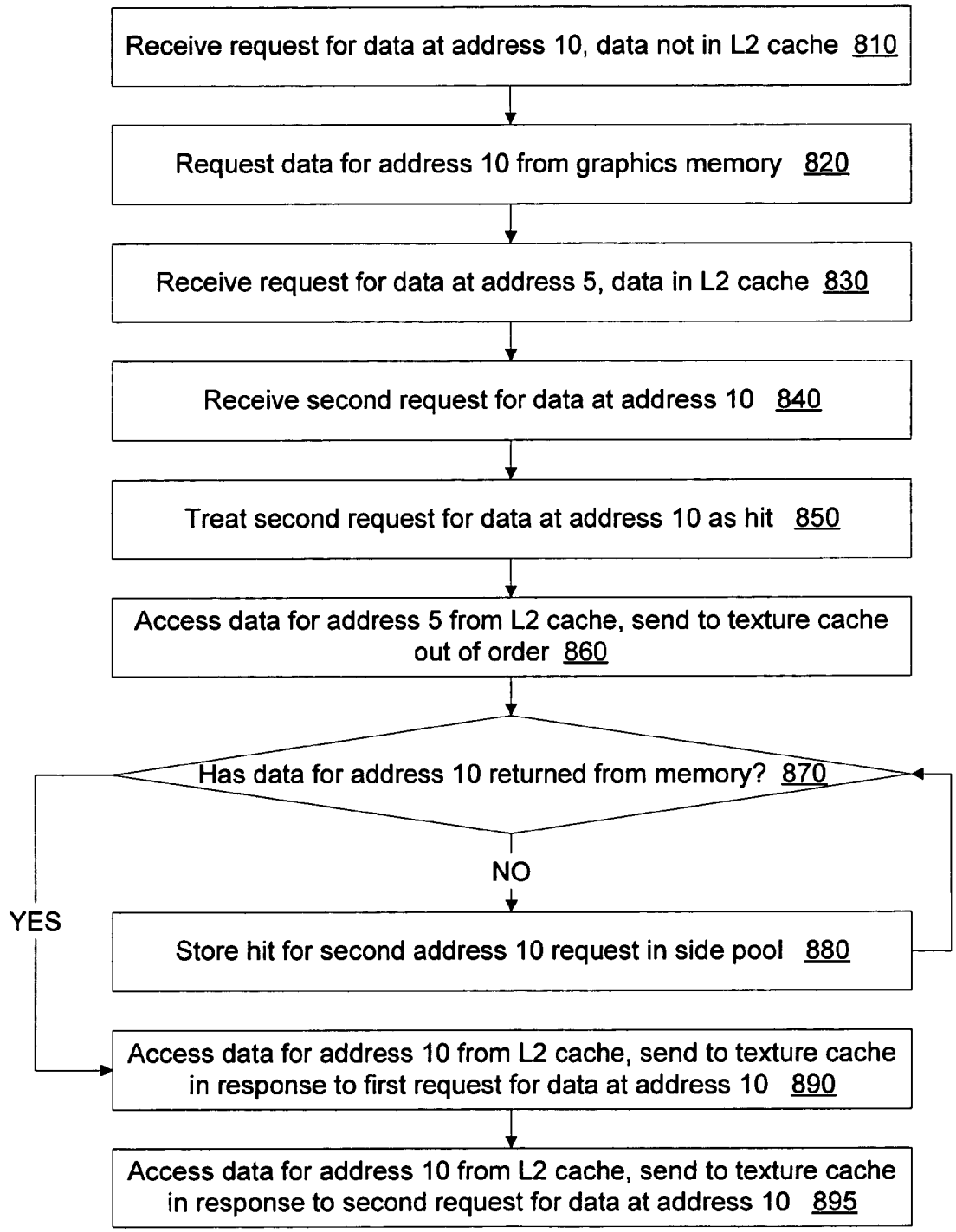
FIG. 8 is a flowchart of an L2 cache utilizing an auxiliary memory for holding subsequent data requests to an address while a previous data request to the address is processed.

FIG. 8 is a flowchart of an L2 cache utilizing an auxiliary memory for holding subsequent data requests for data at an address while a previous request for data at the address is processed. Again, this sequence of requests is shown for exemplary purposes only.

In act 810, a request for data at address 10 is received by the L2 cache. The L2 cache determines that the requested data is not currently stored in the L2 cache. Accordingly, in act 820, this data is requested from the graphics memory.

A request for data at address 5 is received in act 830. It is determined that the L2 cache is currently storing this data, so the request is not set to the graphics memory. In act 840, the L2 cache receives a second request for data at address 10. Again, it would be redundant to make a second request for this data from the graphics memory. Accordingly, in act 850, this second request is treated as a hit.

In act 860, the data for address 5 is accessed and provided to the texture cache. In act 870, it is determined whether the data for address 10 has returned from the graphics memory. If it has not, the request is stored in a side pool in act 880. If it has, then the data can be accessed from the level 2 cache and provided to the texture cache in response to the first request for data at address 10 in act 890. If the request is stored in the side pool in act 880, once the data for address 10 has been retrieved from the graphics memory in act 860, the request may be provided to the second-level cache memory in act 890. After data is provided to the texture cache in response to the first request for data at address 10 in act 890, data can be provided to the texture cache in response to the second request for data at address 10 in act 895.

Again, each L2 cache in each partition supplies texels for each of a number of texture caches via a crossbar circuits. It is desirable that the crossbar remain utilized to the fullest extent possible. Accordingly, embodiments of the present invention provide an auxiliary memory where requests or pointers indicating that data is available in the L2 cache can be held until the crossbar is able to provide the data from the L2 cache to the appropriate texture cache. The following figure illustrates the use of this auxiliary memory.

Figure 9:
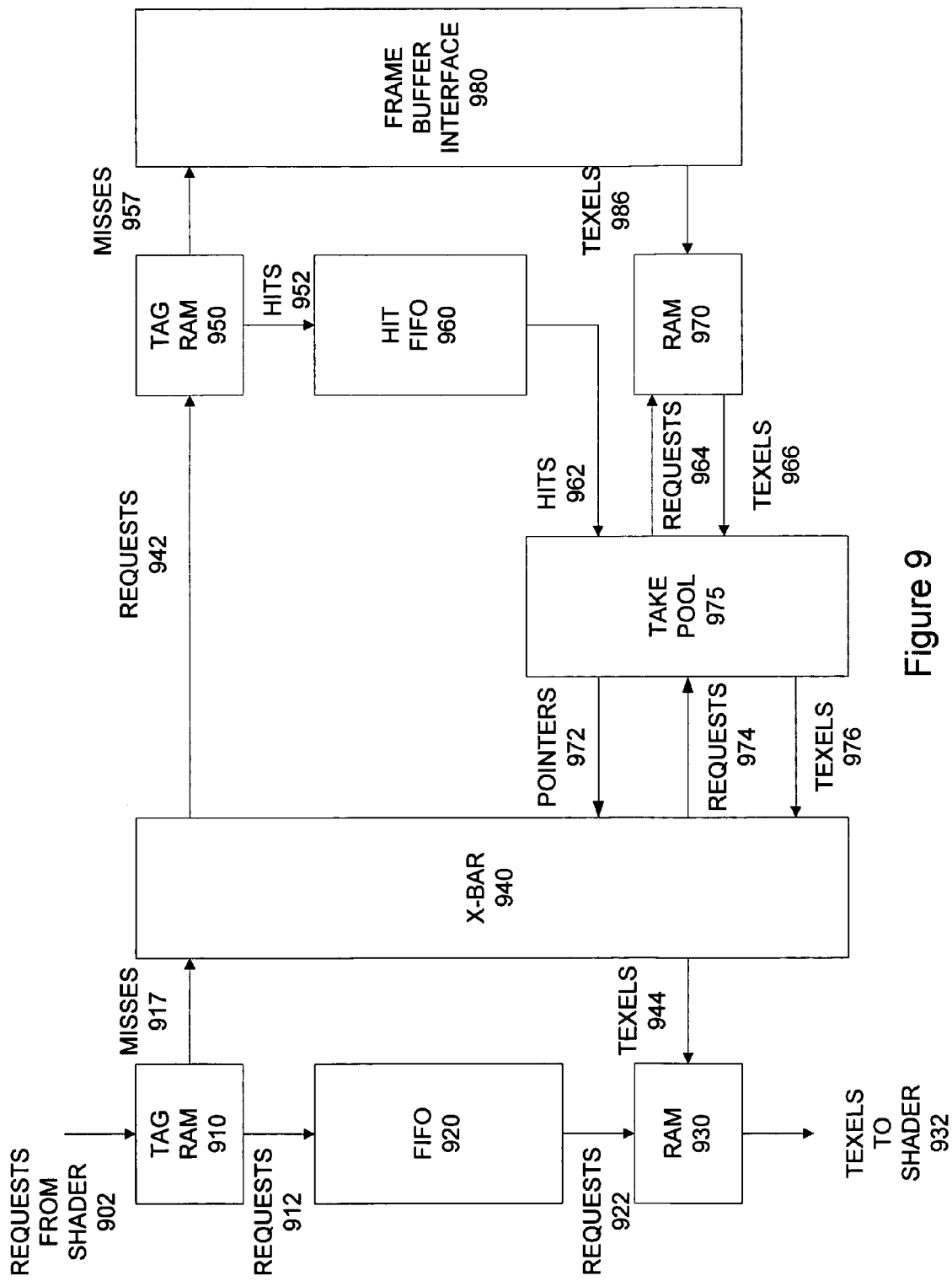
FIG. 9 is a block diagram illustrating the use of an auxiliary memory for holding pointers to data that is ready to be retrieved from an L2 cache.

FIG. 9 is a block diagram illustrating the use of an auxiliary memory for holding pointers to data that is ready to be retrieved from an L2 cache until it is provided to a requesting texture cache. This auxiliary memory may be appropriately referred to as a take pool, since the crossbar may take texels from the L2 cache via these auxiliary memories.

This figure includes a texture cache including a tag RAM 910, FIFO 920, and RAM 930, a crossbar 940, a partition that includes an L2 cache including a tag RAM 950, hit FIFO 960, RAM 970, take pool 975, and a frame buffer interface 980.

The take pool 975 stores requests or other pointers that indicate what data is available in the RAM 970 for retrieval by the crossbar 940. The crossbar 940 services a request from a texture cache by requesting data corresponding to one of the pointers in the take pool 975. In various embodiments of the present invention, the crossbar 940 may read the pointers and send the request either to the take pool 975 or directly to the RAM 970. In one embodiment of the present invention, the request is made to the take pool 975. The take pool 975 then requests texel data from the RAM 970 and provides it to the crossbar 940.

In a specific embodiment of the present invention, hit requests emerge from the hit FIFO 960 and are stored in the take pool 975. Alternately, the request may be translated into another type of pointer, which is stored in the take pool 975. The crossbar 940 services requests by surveying the pointers on line 972 provided by the take pool 975. The crossbar sends a request on line 974 to the take pool 975 for data corresponding to one of the pointers on line 972. The take pool 975 passes the request on line 964 to the RAM 970, which retrieves the requested data and provides it on line 966 to the take pool 975. The take pool 975 then passes the data on line 976 to the crossbar 940. The crossbar 940 provides the data to the originally requesting texture cache pipeline.

The take pool 975 may be a memory, a number of registers, or other storage circuits. In a specific embodiment of the present invention, the take pool 975 is four entries deep, though in other embodiments of the present invention the take pool may have different depths. The crossbar 940 may further include an arbiter circuit (not shown). The take pool 975 may provide pointer or requests on line 976 as well as the age of the oldest pointer or request in the take pool 975. This and other information may be used by the arbiter in crossbar 940 in determining which texels to provide to a texture cache on a given clock cycle.

Figure 10:
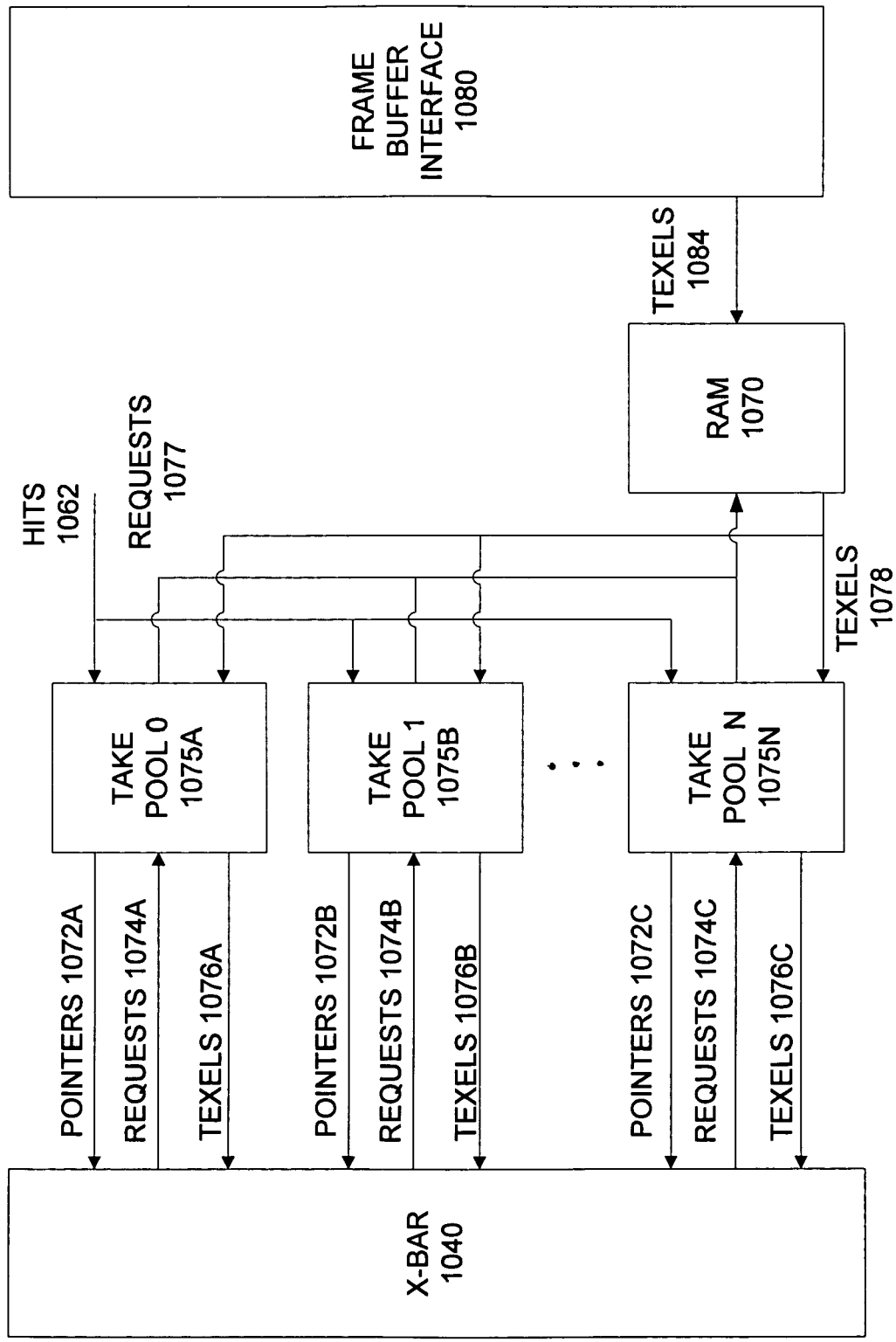
FIG. 10 is a more detailed block diagram illustrating the use of a number of auxiliary memories for holding data retrieved from an L2 cache until it is provided to a requesting texture cache.

FIG. 10 is a more detailed block diagram illustrating the use of a number of auxiliary memories for holding data retrieved from an L2 cache until it is provided to requesting texture caches. This figure includes a crossbar 1040, L2 cache memory 1070, frame buffer interface 1080, and take pools 0 1075A through N 1075N. Embodiments of the present invention may also incorporate both the take pools shown and a side pool as shown in previous figures.

Again, hit requests emerge from a hit FIFO (not shown) and are stored (or converted to pointers that are stored) in the take pools 1075A-1075N. The crossbar 1040 can review the requests or pointers on lines 1072A-1072N. The crossbar 1040 sends requests for corresponding data on lines 1074A-1074N to the take pools 1075A-1075N, which pass the requests on line 1077 to the RAM 1070. The RAM 1070 provides the requested data to the appropriate take pool 1075A-1075N, which in turn passes it on lines 1076A-1076N to the crossbar 1040. The crossbar 1040 then passes the texel data to the originally requesting texture cache pipeline.

The crossbar 1040 can arbitrate among the take pools 1075A-1075N by considering several criteria. Some of these criteria include the number of entries in any one take pool, the age of the oldest request in a take pool, and the urgency of a request that has resulted in data in a take pool. Age can be measured as the time that the L2 cache has had the request, or by how long it has been since a texture cache made the request. Urgency can be measured by how near the recipient texture cache is to needing data. In various embodiments of the present invention, these or other criteria can be used in arbitrating among the take pools 1075A-1075N.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit including a first number of memory interface partitions, each partition including a second-level cache, each second-level cache comprising:
    a tag ram configured to receive read requests for data and to determine whether data requested by a read request is stored in the second-level cache;
    a frame buffer interface configured to receive read requests from the tag ram;
    a first-in-first-out memory configured to receive read requests from the tag ram;
    a first auxiliary memory configured to receive read requests from the first-in-first-out memory; and
    a second-level cache memory configured to receive read requests from the first auxiliary memory and the first-in-first-out memory.

2. The integrated circuit of claim 1 wherein the tag ram provides a first read request to the frame buffer interface if data requested by the first read request is not stored in the second-level cache and has not been requested from the frame buffer interface,
    the tag ram provides a second read request to the first-in-first-out memory if data requested by the second read request is not stored in the second-level cache and has been requested from the frame buffer interface, and
    the tag ram provides a third read request to the first-in-first-out memory if data requested by the third read request is stored in the second-level cache.

3. The integrated circuit of claim 2 wherein the first-in-first-cut memory provides the second read request to the first auxiliary memory if data requested by the second read request is not stored in the second-level cache,
    the first-in-first-out memory provides the second read request to the second-level cache memory if data requested by the second read request is stored in the second-level cache, and
    the first-in-first-out memory provides the third read request to the second-level cache memory.

4. The integrated circuit of claim 3 wherein the auxiliary memory provides the second read request to the cache memory if data requested by the second read request is stored in the second-level cache.

5. The integrated circuit of claim 1 further comprising a second number of second auxiliary memories configured to receive data from the second-level cache memory.

6. The integrated circuit of claim 5 further comprising an arbitration circuit configured to receive data from the second number of second auxiliary memories, and further configured to provide data to a second number of texture caches.

7. An integrated circuit including a first number of memory interface partitions, each partition including a second-level cache, each second-level cache comprising:
    a tag ram configured to receive read requests for data and to determine whether data requested by a read request is stored in the second-level cache;
    a frame buffer interface configured to receive read requests from the tag ram;
    a first-in-first-out memory configured to receive read requests from the tag ram;
    a second-level cache memory configured to receive read requests from the first-in-first-out memory; and
    a second number of first auxiliary memories configured to receive data requested by read requests from the second-level cache memory and further configured to provide data requested by read requests to a second number of texture caches.

8. The integrated circuit of claim 7 wherein the tag ram provides a first read request to the frame buffer interface if data requested by the first read request is not stored in the second-level cache and has not been requested from the frame buffer interface,
    the tag ram provides a second read request to the first-in-first-out memory if data requested by the second read request is not stored in the second-level cache and has been requested from the frame buffer interface, and
    the tag ram provides a third read request to the first-in-first-out memory if data requested by the third read request is stored in the second-level cache.

9. The integrated circuit of claim 8 wherein the first-in-first-out memory provides the second read request to the second-level cache memory if data requested by the second read request is stored in the second-level cache, and the first-in-first-out memory provides the third read request to the second-level cache memory.

10. The integrated circuit of claim 9 wherein each of the first auxiliary memories provide data and age information relating to the data to an arbiter.

11. The integrated circuit of claim 10 further comprising a second auxiliary memory configured to receive read requests from the first-in-first-out memory and further configured to provide read requests to the second-level cache memory.

12. The integrated circuit of claim 11 wherein the first-in-first-out memory provides the second read request to the auxiliary memory if data requested by the second read request is not stored in the second-level cache.

13. The integrated circuit of claim 12 wherein the second auxiliary memory provides the second read request to the cache memory if data requested by the second read request is stored in the second-level cache.

14. An integrated circuit including a first number of memory interface partitions, each partition including a second-level cache, each second-level cache comprising:
   a tag ram configured to receive read requests for data and to determine whether data requested by a read request is stored in the second-level cache;
   a frame buffer interface configured to receive read requests from the tag ram;
   a first-in-first-out memory configured to receive read requests from the tag ram;
   a second-level cache memory to receive read requests from the first-in-first-out memory and to provide data requested by the read requests; and
   a first auxiliary memory configured to receive read requests from the first-in-first-out memory when the requested data is not available in the second-level cache memory and to provide read requests to the second-level cache memory once the requested data is available in the second-level cache memory.

15. The integrated circuit of claim 14 wherein the tag ram provides a first read request to the frame buffer interface if data requested by the first read request is not stored in the second-level cache and has not been requested from the frame buffer interface,
   the tag ram provides a second read request to the first-in-first-out memory if data requested by the second read request is not stored in the second-level cache and has been requested from the frame buffer interface, and
   the tag ram provides a third read request to the first-in-first-out memory if data requested by the third read request is stored in the second-level cache.

16. The integrated circuit of claim 15 wherein the first-in-first-out memory provides the second read request to the first auxiliary memory if data requested by the second read request is not stored in the second-level cache,
   the first-in-first-out memory provides the second read request to the second-level cache memory if data requested by the second read request is stored in the second-level cache, and
   the first-in-first-out memory provides the third read request to the second-level cache memory.

17. The integrated circuit of claim 16 wherein the auxiliary memory provides the second read request to the cache memory if data requested by the second read request is stored in the second-level cache.

18. The integrated circuit of claim 14 further comprising a second number of second auxiliary memories configured to receive data from the second-level cache memory.

19. The integrated circuit of claim 18 further comprising an arbitration circuit configured to receive data from the second number of second auxiliary memories, and further configured to provide data to a second number of texture caches.

* * * * *